United States Patent [19]

Ino et al.

[11] Patent Number: 4,700,069

[45] Date of Patent: Oct. 13, 1987

[54] MASS SPECTROMETER OF A QUADRUPOLE ELECTRODE TYPE COMPRISING A DIVIDED ELECTRODE

[75] Inventors: Yoichi Ino; Isamu Morisako, both of Tokyo, Japan

[73] Assignee: Anelva Corporation, Japan

[21] Appl. No.: 739,984

[22] Filed: May 31, 1985

[30] Foreign Application Priority Data

Jun. 1, 1984 [JP] Japan ............................... 59-112367

[51] Int. Cl.$^4$ ............................................ B01D 59/44

[52] U.S. Cl. .................................... 250/292; 250/290

[58] Field of Search ........................ 250/281, 292, 290

[56] References Cited

U.S. PATENT DOCUMENTS

| | | | |
|---|---|---|---|
| 3,147,445 | 9/1964 | Wuerker et al. | 250/292 |
| 3,371,204 | 2/1968 | Brubaker | 250/292 |
| 3,410,997 | 11/1968 | Brubaker | 250/292 |
| 3,553,451 | 1/1971 | Uthe | 250/292 |
| 4,032,782 | 6/1977 | Smith et al. | 250/292 |
| 4,283,626 | 8/1981 | Siegel | 250/292 |

FOREIGN PATENT DOCUMENTS

| | | | |
|---|---|---|---|
| 27554 | 2/1982 | Japan | 250/292 |

*Primary Examiner*—Bruce C. Anderson

*Attorney, Agent, or Firm*—Laff, Whitesel, Conte & Saret

[57] ABSTRACT

In a mass spectrometer, a quadrupole electrode comprises four electrodes arranged at a predetermined interval about a device axis along which the mass spectrometer successively comprises an ionized gas source, the quadrupole electrode, and a detector for detecting the gas particles separated in reference to mass-to-charge ratio. At least one of the electrodes comprises a plurality of electrode elements which are divided along the device axis. Each of the electrode elements has a longitudinal axis. The electrode elements are mechanically connected by a mechanically connecting member so that the longitudinal axis are coincident with one another and parallel to the device axis. The electrode elements are electrically connected by an electrically connecting member.

7 Claims, 11 Drawing Figures

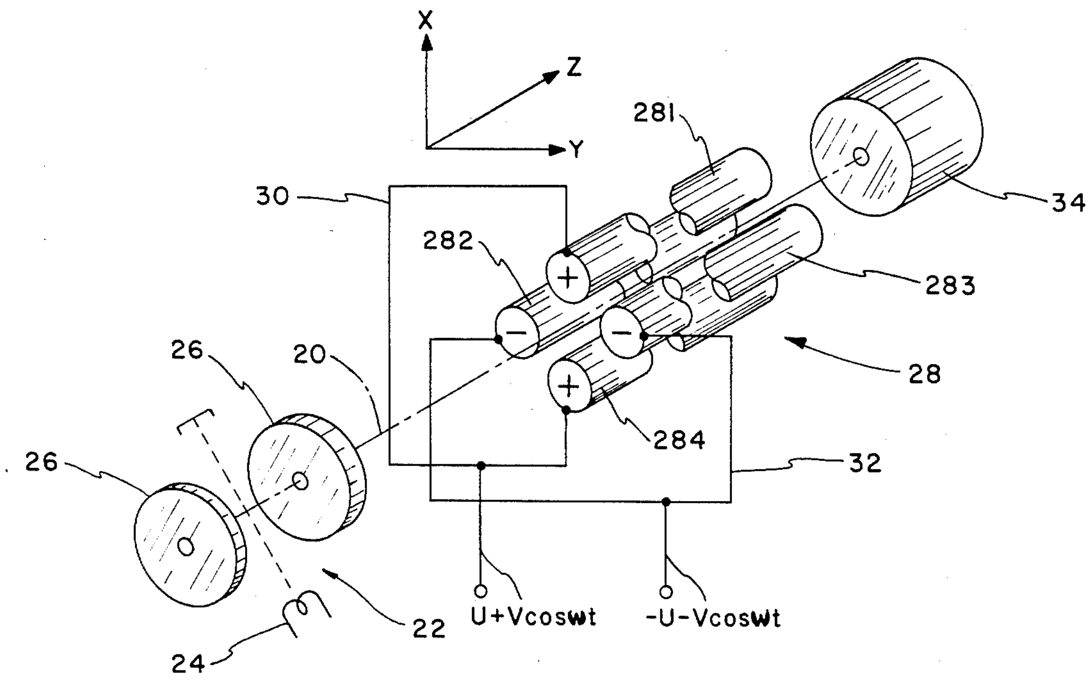
FIG. 1
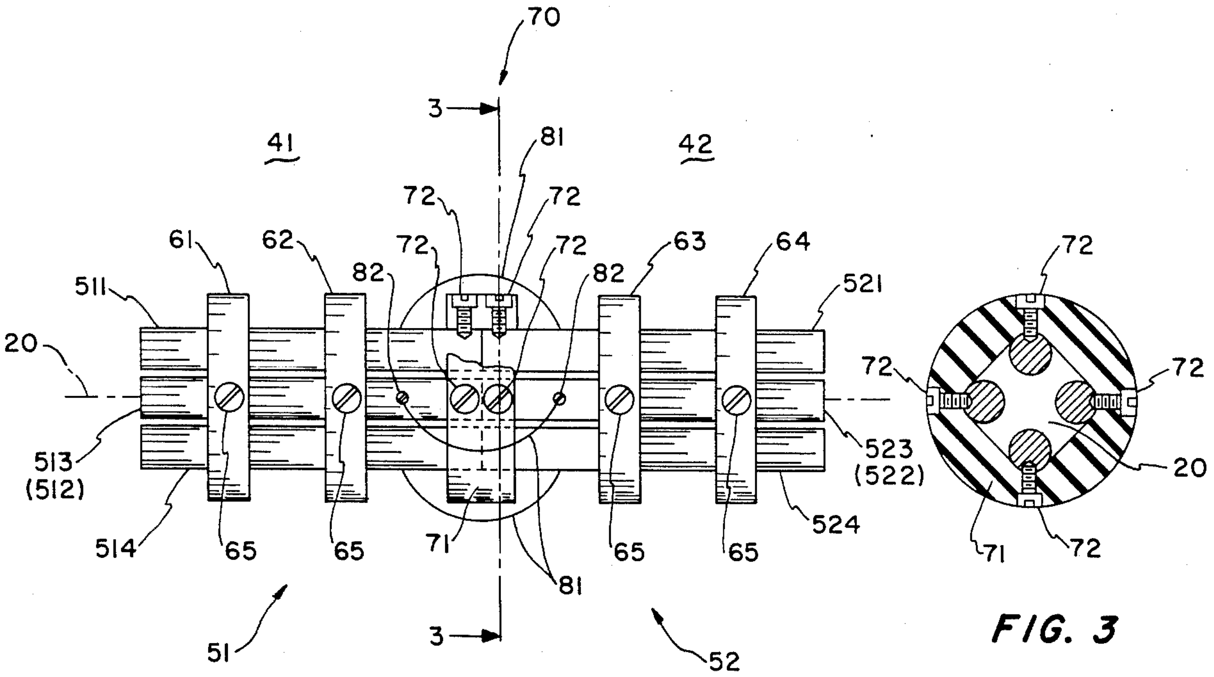
FIG. 2
FIG. 3

MASS SPECTROMETER OF A QUADRUPOLE ELECTRODE TYPE COMPRISING A DIVIDED ELECTRODE

BACKGROUND OF THE INVENTION

This invention relates to a mass spectrometer, such as a secondary ion mass spectrometer, which comprises a quadrupole electrode.

A mass spectrometer has a device axis. The mass spectrometer comprises, along the device axis, an ionizing section in which gas is preliminarily introduced and which is for ionizing particles of the gas to produce ionized particles, a quadrupole electrode for separating the ionized particles in reference to a mass-to-charge ratio to produce mass-separated particles, and a detector for detecting the mass-separated particles. The quadrupole electrode comprises four electrodes arranged about the device axis at a predetermined azimuthal interval. In the manner which will later be described more in detail, the quadrupole electrode is supplied with a pair of high-frequency voltages superposed on a direct-current potential.

In a conventional mass spectrometer of the type described, four kinds of methods are adopted to analyze the mass-to-charge ratio of ionized particles of high axial energy.

In a first one of the four methods, the high frequency voltages have a common adjustable frequency. The ionized particles are radially accelerated with a maximum accelerating energy which is proportional to a square of the frequency. The frequency is raised to achieve a high radial energy. However, the first method is disadvantageous in that a great deal of high frequency electric power is consumed because the high frequency electric power is consumed in proportion to the frequency to the fifth power.

A second one of the four methods is to vary the direct-current potential of the quadrupole electrode so as to render the direct-current potential substantially near to an energy potential of the ionized particles. The second method is advantageous in that only ions of an energy range are analyzed but are disadvantageous in that the mass spectrometer has a sensitivity which is inevitably reduced because all of the ions can not be analyzed.

A third one of the four methods is to use an energy filter known in the art. The third method is advantageous and disadvantageous like the second method.

A fourth one of the four methods is to lengthen the quadrupole electrode. In this case, the quadrupole electrode should be arranged or assembled with a high accuracy. But, it is difficult to insure a necessary accuracy of assembly because the quadrupole electrode of a longer length such as 60 mm or so, makes it difficult to assemble the quadrupole electrode and to support the same. As a result, such a mass spectrometer is not feasible because a resolution of mass spectrum is inescapably degraded with a length of the quadrupole electrode.

SUMMARY OF THE INVENTION

It is an object of this invention to provide a mass spectrometer which is capable of attaining a high resolution.

It is another object of this invention to provide a mass spectrometer which can lengthen a quadrupole electrode without degradation of the resolution.

It is still another object of this invention to provide a mass spectrometer which is capable of analyzing ionized particles of high axial energy.

A mass spectrometer to which this invention is applicable has a device axis and comprises, along the device axis, ionizing means for ionizing gas particles to produce ionized particles, a quadrupole electrode for separating the ionized particles in reference to a mass-to-charge ratio to produce mass-separated particles, and a detector for detecting the mass-separated particles. The quadrupole electrode comprises four electrodes arranged about the device axis at a predetermined interval. According to this invention, at least one of the electrode comprises a plurality of electrode elements which are divided along the device axis and each of which has a longitudinal axis, mechanically connecting means for mechanically connecting the electrode elements so that the longitudinal axis of the electrode elements are coincident with one another and parallel to the device axis, and electrically connecting means for electrically connecting the electrode elements to make the electrode elements have a common electric potential. The mechanically connecting means mechanically supports the at least one electrode and other electrodes with all of the electrodes kept symmetrically with one another about the device axis.

According to an aspect of this invention, each of the other electrodes is divided transversely of the device axis into a plurality of additional electrode elements. The additional electrode elements have a common additional longitudinal axis common thereto. The mechanically connecting means is for supporting the additional electrode elements with the common additional longitudinal axis kept parallel to the device axis together with at least one element.

BRIEF DESCRIPTION OF THE DRAWING

FIG. 1 is a schematic perspective view for use in describing principle of a mass spectrometer;

FIG. 2 is an elevational view, partly in longitudinal section, of a quadrupole electrode for use in a mass spectrometer according to a first embodiment of this invention;

FIG. 3 is a cross-sectional view taken on line 3—3 of FIG. 2;

DESCRIPTION OF THE PREFERRED EMBODIMENTS

Figure 4:
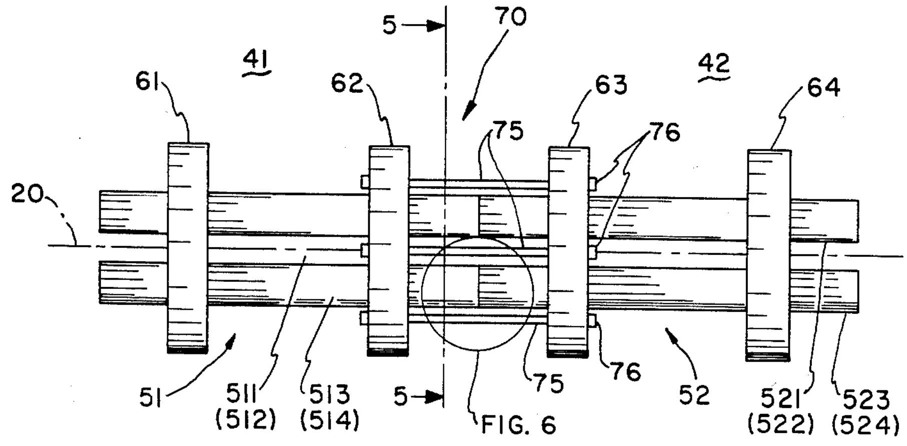
FIG. 4 is an elevational view of a quadrupole electrode for use in a mass spectrometer according to a second embodiment of this invention.

Referring to FIG. 1, a mass spectrometer will generally be described at first for a better understanding of this invention. The mass spectrometer has a device axis (Z-axis) 20. The mass spectrometer comprises an ion source 22 for ionizing gas particles to produce ionized particles. The ion source 22 comprises an electron gun 24 for radiating an electron beam to the gas particles to make the gas particles ionize the ionized particles, and a pair of ion source electrodes 26 for directing the ionized particles as an ion beam along the device axis 20.

A quadrupole electrode 28 is for separating the ion beam in reference to a mass-to-charge ratio of the ionized particles to produce mass-separated particles. The quadrupole electrode 28 comprises first to fourth electrodes 281, 282, 283, and 284, each of which has a cylindrical shape. The electrodes 281 through 284 are arranged about the device axis 20 at a predetermined azimuthal interval and parallel to each other. The first and the fourth electrodes 281 and 284 are on opposite sides of the device axis 20 and define an X-axis which is orthogonal to the Z-axis. The second and the third electrodes 282 and 283 are similarly on opposite sides of the device axis 20 and define a Y-axis of a right-hand orthogonal coordinate system in cooperation with the X-axis and the device or Z-axis. The first and the fourth electrodes 281 and 284 are electrically connected by a first connecting line 30 while the second and the third electrodes 282 and 283 are electrically connected by second connecting line 32.

A first voltage (U+Vcosωt) is given by superposition of a first high frequency voltage Vcosωt on a first DC voltage U. A second voltage (−U−Vcosωt) is equal to a superposition of a second high frequency voltage −Vcosωt on a second DC voltage −U. The first and the second voltages are applied to the first and the second connecting lines 30 and 32, respectively. By application of such voltages, a hyperbolic electric field is formed in an internal space which is surrounded by the electrodes 281, 282, 283, and 284.

A detector 34 is for detecting the mass-separated particles as an ion current. The detector 34 comprises a secondary electron multiplier (not shown) for detecting the mass-separated particles to produce secondary electrons, and a Faraday collector (not shown) for collecting the secondary electrons to transform the secondary electrons into the ion current of a current magnitude which corresponds to the number of the secondary electrons.

Each pair of the first through the fourth electrodes 281 to 284 has ideally a cross-section of a hyperbola which has a center on the device axis 20. In practice, each electrode 281, 282, 283, or 284 has a circular cross-section with the electrodes 281 through 284 arranged symmetrically about the device axis 20. When the hyperbolic electric field is formed by the cylindrical electrodes, the size of the electrodes is well approximated by:

$$r = 1.148 \cdot r_0 \qquad (1)$$

where r represents the radius of each electrode and $r_0$, a shortest distance between the device axis 20 and each electrode.

When the ion beam generated from the ion source 22 is incident into the quadrupole electrode 28 along the device axis 20 in the positive direction of the Z-axis, the ion beam is radially given a force in the direction of the X-axis or the Y-axis by the hyperbolic electric field formed within the quadrupole electrode 28 while the ion beam axially propagates in the direction of the Z-axis.

In the manner described above, the high frequency voltages have a peak value of V and an angular frequency of ω. The first through the fourth electrodes 281 to 284 have a distance which is equal to $2r_0$. Under the circumstances, the ionized particles axially move along undulating orbiting paths in the internal space. In other words, the orbiting paths m/e have an amplitude which is limited in the direction of the X-axis and/or the Y-axis. Only the ionized particles having a mass-to-charge ratio m/e which satisfies the following equation can pass through the quadrupole electrode 28 to arrive at the detector 34.

$$\frac{m}{e} = \frac{1}{0.701} \cdot \frac{4V}{r_0^2\omega^2} \qquad (2)$$

The remaining ions having mass-to-charge ratios other than the mass-to-charge ratio m/e can not arrive at the detector 34 because the amplitude of the orbiting paths become larger so that the remaining ions are either caught at the electrodes of the quadrupole electrode 28 or pass aside between two adjacent ones of the first through the fourth electrodes 281 to 284.

Passing through the quadrupole electrode 28 and arriving at the detector 34, the ion particles are detected by the secondary electron multiplier (not shown) placed in the detector 34. The secondary electron multiplier produces the secondary electrons which are transformed into the ion current corresponding to the number of the secondary electrons by the Faraday collector placed in the detector 34. The ion current is recorded by an oscilloscope, a pen recorder, or the like in order to obtain the desired mass spectrum.

As well known for those skilled in the art, the quadrupole electrode 28 must very accurately be wrought in shape and size and precisely assembled together in order to analyze a mass spectrum with a high resolution within a restricted voltage and size. In addition, it is difficult to make and assemble such a high accuracy of the quadrupole electrode 28 as the length of the quadrupole electrode 28 becomes long in the direction of the Z-axis, as mentioned before.

FIRST EMBODIMENT

Referring to FIG. 2, a quadrupole electrode is for use in a mass spectrometer according to a first embodiment of this invention and is divided into first and second quadrupole electrode assemblies 41 and 42 along the device axis 20.

The first and the second electrode assemblies 41 and 42 comprise first and second electrode groups 51 and 52, respectively. The first and the second electrode groups 51 and 52 have first through fourth cylindrical electrode elements 511, 512, 513, and 514 and fifth through eighth ones 521, 522, 523, and 524, respectively. All of the cylindrical electrode elements have a common length and a common cross-sectional shape. Each of cylindrical electrode elements has a longitudinal axis in parallel to the device axis 20.

Each of the first and the second electrode assemblies 41 and 42 further comprises a pair of insulator supports.

The insulator supports of the first and the second electrode assemblies 41 and 42 are named first and second supports 61 and 62 and third and fourth ones 63 and 64. All of the insulator supports have a common size. Each of the insulator supports has a square inner surface. The insulator supports of each pair are spaced apart along the device axis 20 to support either one of the first and the second electrode groups 51 and 52.

Each of the electrode assemblies 41 and 42 is assembled in such a manner that the four cylindrical electrode elements are received on four corners of the square inner surfaces of each insulator support and fixed to the four corners by a plurality of screws which are shown at a common reference numeral 65 and which are threaded into the cylindrical electrode elements through the insulator supports. The four cylindrical electrode elements of each pair are equally azimuthally spaced apart about the device axis 20.

The first through the fourth cylindrical electrode elements 511, 512, 513, and 514 have element ends adjacent to those of the fifth through the eighth cylindrical electrode elements 521, 522, 523, and 524, respectively. First through fourth abutting portions are formed between two adjacent ends of both of the first and the second electrode groups 51 and 52.

Referring to FIG. 3 together with FIG. 2, description will be made about assemblage of the first and the second electrode assemblies 41 and 42.

The first and the second quadrupole electrode assemblies 41 and 42 are at first mechanically connected to each other by a mechanical coupler 70. The mechanical coupler 70 comprises an insulator support 71 having a square inner surface, and eight screws which are collectively shown at 72. Four of the screws 72 are for fixing the first electrode group 51 and the remaining screws are for fixing the second electrode group 52, as will become clear later.

The square inner surface of the insulator support 71 surrounds the first through the fourth coupling portions formed at the two adjacent ends of both of the first and the second electrode groups 51 and 52. The first and the second quadrupole electrode assemblies 41 and 42 are fixed to the four corners of the square inner surface of the insulator support 71 by the eight screws 72 four of which are threaded into the cylindrical electrode elements 511 to 514 through the insulator support 71 and the remaining ones of which are threaded into the cylindrical electrode elements 521 to 524 through the insulator support 71. Thus, the cylindrical electrode elements 511, 512, 513, and 514 of the first electrode group 51 are mechanically connected to the cylindrical electrode elements 521, 522, 523, and 524 of the second electrode group 52 to provide four element pairs, respectively. The longitudinal axes of the cylindrical electrode elements of the first electrode group 51 are made to coincide with those with the corresponding cylindrical electrode elements of the second electrode group 52. Thus, four element pairs have common axes parallel to the device axis 20.

By the way, both ends of the cylindrical electrode elements of each element pair may not be always brought into contact with each other. In other words, a spacing may be left between the cylindrical electrode elements of each element pair. In this event, the cylindrical electrode elements of each element pair is electrically isolated from each other. However, it is readily possible to electrically connect each element pair in a manner to be described hereinunder.

More specifically, each electrode pair 511-521, 512-522, 513-523, and 514-524 is electrically connected by an electrical coupler. The illustrated electrical coupler comprises four of conductive wires represented by 81 and eight of additional screws represented by 82. The conductive wires 81 are fastened to both of the mechanical coupler 70 on each outside surface of the cylindrical electrode elements by the use of the additional screw pairs 82, respectively, as shown in FIG. 2. With this structure, it is possible to equivalently extend or lengthen the quadrupole electrode without a reduction of precision.

SECOND EMBODIMENT

Figure 5:
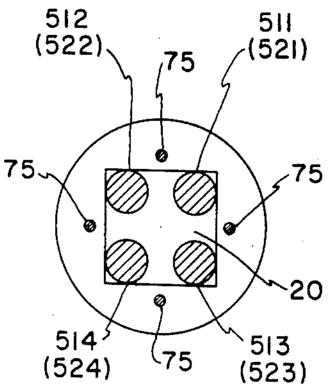
FIG. 5 is a cross-sectional view taken on line 5—5 of FIG. 4.

Referring to FIGS. 4 and 5, another quadrupole electrode is for use in a mass spectrometer according to a second embodiment of this invention and comprises similar parts designated by like reference numerals. In the example being illustrated, the second insulator support 62 and the third insulator support 63 are operable as a part of the mechanical coupler 70 and this structure dispenses with the insulator support 71 illustrated in FIGS. 2 and 3. In this connection, a distance between the second and the third insulator supports 62 and 63 becomes short in comparison with that illustrated in FIG. 2. The mechanical coupler 70 comprises first through fourth bolts represented by 75 and first through fourth nuts represented by 76. The bolts are coupled to the second and the third insulator supports 62 and 63 along the device axis 20 so as to compress both supports 62 and 63. Each of the bolts has a longitudinal axis parallel to the device axis 20.

With this structure, the first and the second quadrupole electrode assemblies 41 and 42 are fixed to the mechanical coupler 70 at the first through the fourth coupling portions by the first through the fourth bolts 75 through the second and the third insulator supports 62 and 63 and the first through the fourth nuts 76 as shown in FIG. 4. Thus, the cylindrical electrode elements of each pair 511-521, 512-522, 513-523, and 514-524 are mechanically connected to the other element of each pair. In this event, each pair has a common longitudinal axis parallel to the device axis 20.

The cylindrical electrode elements 511-521, 512-522, 513-523, and 514-524 of each pair may be electrically connected to each other in a manner similar to that described in conjunction with FIG. 2 when a spacing is left between the cylindrical electrode elements of each pair.

In this embodiment, each of the quadrupole electrode assemblies 41 and 42 may be manufactured and assembled in a conventional manner. For example, each of the electrode elements has a length and a diameter equal to 300 mm and 10 mm, respectively, and may be wrought at an accuracy of the order of 2 to 3 micron meters. Each of the quadrupole electrode assemblies 41 and 42 is assembled at an accuracy of the order of several micron meters.

The accuracy of the above-mentioned order will be called a "predetermined accuracy". As a result, it is readily understood that each electrode element has a length which can be mechanically determined within the predetermined accuracy. Preferably, the length of each electrode element must not exceed 300 mm.

In the meanwhile, a quadrupole electrode should have an acceptable tolerance less than 10 micron meters and must be assembled with accuracy within the acceptable tolerance.

Figure 6:
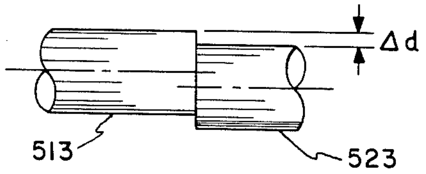
FIG. 6 is an enlarged view of a portion of the quadrupole electrode depicted in FIG. 4, which portion is labelled "FIG. 6" in FIG. 4.

On connection of the first and the second electrode assemblies 41 and 42, an offset may take place between the first and the second electrode assemblies 41 and 42, as illustrated in FIG. 6. However, the offset can be reduced to one or two micron meters. Accordingly, the accuracy of the illustrated quadrupole electrode can be improved in comparison with the conventional electrode.

THIRD EMBODIMENT

Figure 7:
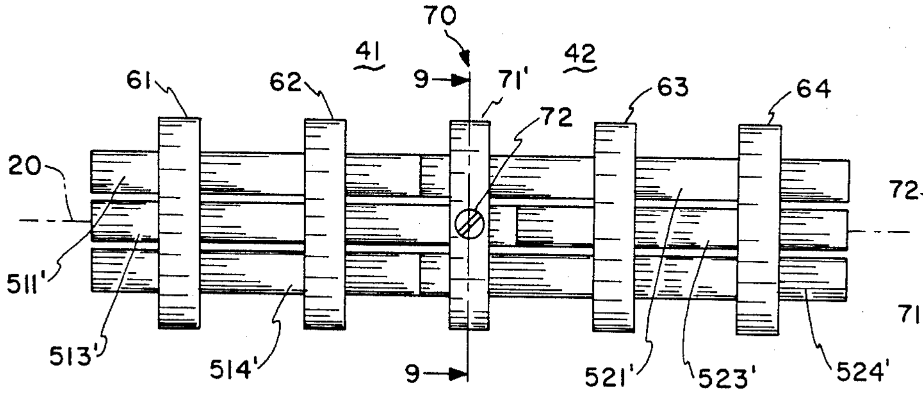
FIG. 7 is an elevational view of a quadrupole electrode for use in a mass spectrometer according to a third embodiment of this invention.
Figure 9:
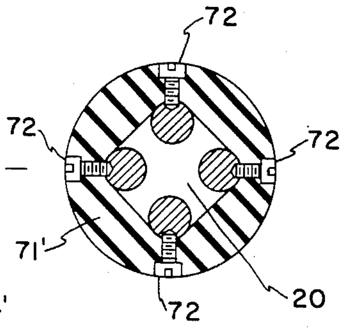
FIG. 9 is a cross-sectional view taken on line 9—9 of FIG. 7.
Figure 8:
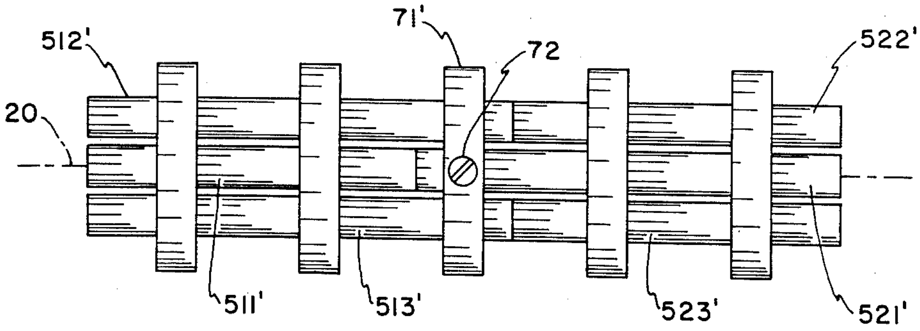
FIG. 8 is a plan view thereof.

Referring to FIGS. 7 through 9, a quadrupole electrode is for use in a mass spectrometer according to a third embodiment of this invention and comprises similar parts designated by like reference numerals. All of the cylindrical electrode elements have a common cross-sectional shape, as illustrated in FIG. 9. However, the cylindrical electrode elements 511', 514', 522', and 523' of a common length are shorter than the cylindrical electrode elements 512', 513', 521', and 524' of another common length.

The first and the second quadrupole electrode assemblies 41 and 42 are at first mechanically connected to each other by a mechanical coupler 70. The mechanical coupler 70 comprises an insulator support 71' having a square inner surface, and four screws which are collectively shown at 72. Two of the screws 72 are for fixing the cylindrical electrode elements 512' and 513' of the first electrode group 51 and the remaining screws are for fixing the cylindrical electrode elements 521' and 524' of the second electrode group 52, as will become clear later.

The square inner surface of the insulator support 71' surrounds outer surfaces of the cylindrical electrode elements 512', 513', 521', and 524'. The first and the second quadrupole electrode assemblies 41 and 42 are fixed to the four corners of the square inner surface of the insulator support 71' by four screws 72 two of which are threaded into the cylindrical electrode elements 512' and 523' through the insulator support 71' and the remaining ones of which are threaded into the cylindrical electrode elements 521' and 524' through the insulator support 71'. Thus, the cylindrical electrode elements 511', 512', 513', and 514' of the first electrode group 51 are mechanically connected to the cylindrical electrode elements 521', 522', 523', and 524' of the second electrode group 52 to provide four element pairs, respectively. The longitudinal axes of the cylindrical electrode elements of the first electrode group 51 are made to coincide with those of the corresponding cylindrical electrode elements of the second electrode group 52. Thus, four element pairs have common axes parallel to the device axis 20.

The cylindrical electrode elements 511'-521', 512'-522', 513'-523', and 514'-524' of each pair may be electrically connected to each other in a manner similar to that described in conjunction with FIG. 2 when a spacing is left between the cylindrical electrode elements of each pair.

EXAMPLES OF MASS SPECTRUM

Figure 10:
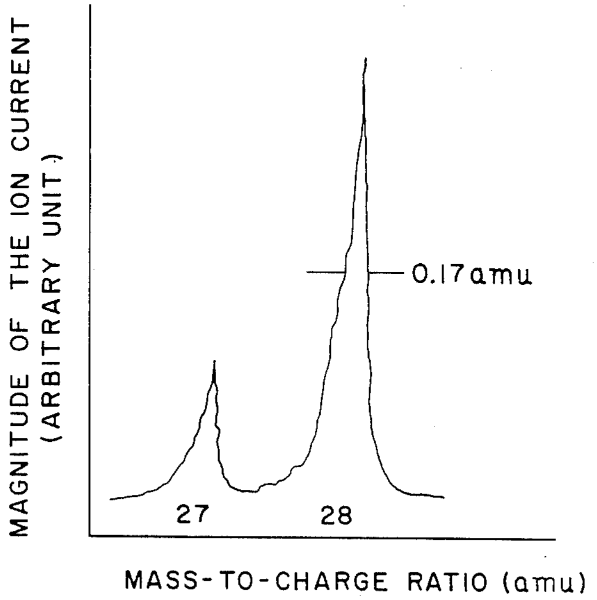
FIG. 10 shows a mass spectrum for use in describing operation of the quadrupole electrode illustrated in FIGS. 4 and 5 with an axial ion energy of 430 volts.
Figure 11:
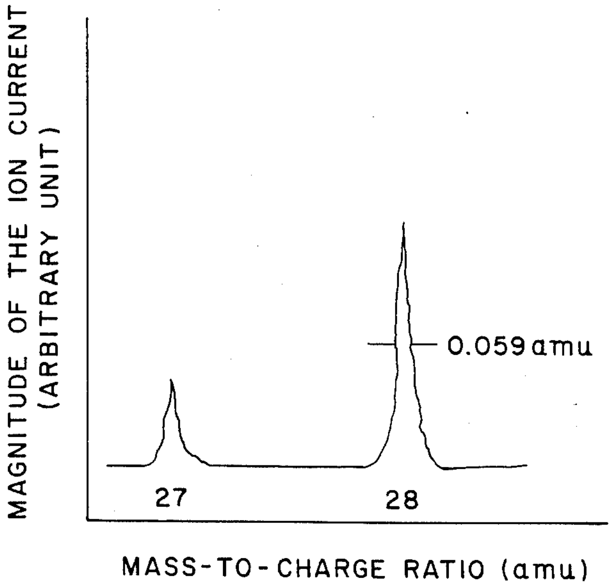
FIG. 11 shows a mass spectrum for use in describing operation of the quadrupole electrode illustrated in FIGS. 4 and 5 with an axial ion energy of 34 volts.

Referring to FIGS. 10 and 11, wherein the abscissa and the ordinate represent a mass-to-charge ratio in atomic mass unit (amu) and the magnitude of the ion current (arbitrary unit), respectively. FIG. 10 shows a mass spectrum for use in describing operation of the quadrupole electrode illustrated in FIGS. 4 and 5 with an axial ion energy kept at 430 volts, while FIG. 11 shows another mass spectrum for use in describing operation of the same with another axial ion energy kept at 34 volts.

In general, a resolution R is given by:

$$R = \frac{M}{\Delta M}$$

where M represents a mass and ΔM, a difference of masses.

In FIG. 10, ΔM is assumed to be equal to 0.17 amu when the mass M is equal to 28 amu. Then, the resolution R becomes equal to about 165. In FIG. 11, ΔM is assumed to be equal to 0.059 amu when the mass M is equal to 28 amu. Then, the resolution R is equal to about 475. Therefore, it is possible to carry out an analysis of ionized ions flying along the device axis 20 over a wide energy range at a high resolution.

The quadrupole electrode according to the first and the third embodiments have mass spectrum similar to the mass spectrum as shown in FIGS. 10 and 11.

While the present invention has thus far been described in conjunction with three embodiments thereof, it will readily be possible for those skilled in the art to put this invention into practice in other manners. For example, some of electrode elements may be substituted for a single electrode element. The quadrupole electrode may be assembled by more than three quadrupole electrode assemblies. The electrode elements may have a cross-section of a hyperbola. The quadrupole electrode may be made of a ceramic material with metal used to cover only that surface portion which is near the device axis.

What is claimed is:

1. A mass spectrometer having a device axis and comprising ionizing means disposed along said device axis for ionizing gas particles to produce ionized particles, a quadrupole electrode for separating said ionized particles in reference to a mass-to-charge ratio to produce mass-separated particles, and detector means for detecting said mass-separated particles, said quadrupole electrode comprising four electrodes which are azimuthally spaced about said device axis and which comprise one electrode and other electrodes, said one electrode comprising:

a plurality of electrode elements which are divided along said device axis, each of said elements having a length which is mechanically workable with a predetermined accuracy;

each of the other electrodes comprising:

a plurality of additional electrode elements which are divided along said device axis and each of said elements having an additional length which is mechanically workable with said predetermined accuracy;

said mass spectormeter comprising:

mechanical connecting means for mechanically connecting said electrode elements and said additional electrode elements to mechanically support said one and the other electrodes with all of said electrodes held symmetrically with respect to one another, said electrodes being held about said device axis; and electrical connecting means for electrically connecting said electrode elements to one another and for connecting said additional electrode elements to one another to make each of said one and the other electrodes have a D.C. electric potential which is assigned thereto.

2. A mass spectrometer as claimed in claim 1, wherein said predetermined accuracy is between 2 and 3 micron meters, inclusive.

3. A mass spectrometer as claimed in claim 1, wherein each of said length and said additional length is no longer than 300 mm.

4. A mass spectrometer as claimed in claim 1, wherein one of said electrode elements has an element end adjacent to that of another one of said electrode elements to form a first abutting portion between two of said electrode elements while one of said additional electrode elements has an additional element end adjacent to that of another one of said additional electrode elements to form a second abutting portion between two of said additional electrode elements.

5. A mass spectrometer as claimed in claim 3, wherein said mechanically connecting means further comprises:

a connecting insulator support for supporting both of said electrode elements and said additional electrode elements at said first and said abutting portions; and a plurality of screws for fixing said electrode elements and said additional electrode elements at said first and second abutting portions through said connecting insulator support.

6. A mass spectrometer as claimed in claim 3, wherein said mechanically connecting means further comprises:

a pair of insulator supports spaced apart from each other along said device axis in the vicinity of said first and second abutting portions with said first and second abutting portions interposed between said insulator supports pair, each of said insulator supports being for supporting said electrode elements and said additional electrode elements; and a plurality of bolts and nuts pair extended along said device axis between said insulator supports pair for fixing said electrode elements and said additional electrode elements at said first and second abutting portions.

7. A mass spectrometer as claimed in claim 3, wherein said mechanically connecting means further comprises:

a connecting insulator support for supporting at least one of said electrode elements and at least one of said additional electrode elements; and a plurality of screws extended transversely of said device axis for fixing said at least one electrode element and said at least one additional electrode element through said connecting insulator support.

* * * * *